(12) United States Patent
Kar et al.

(10) Patent No.: US 12,430,778 B2
(45) Date of Patent: Sep. 30, 2025

(54) DEPTH ESTIMATION USING A NEURAL NETWORK

(71) Applicant: Google LLC, Mountain View, CA (US)

(72) Inventors: Abhishek Kar, Sunnyvale, CA (US); Hossam Isack, Oakland, CA (US); Adarsh Prakash Murthy Kowdle, San Francisco, CA (US); Aveek Purohit, Palo Alto, CA (US); Dmitry Medvedev, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 563 days.

(21) Appl. No.: 17/596,794

(22) PCT Filed: Apr. 19, 2021

(86) PCT No.: PCT/US2021/070422
§ 371 (c)(1),
(2) Date: Dec. 17, 2021

(87) PCT Pub. No.: WO2022/225574
PCT Pub. Date: Oct. 27, 2022

(65) Prior Publication Data
US 2022/0335638 A1     Oct. 20, 2022

(51) Int. Cl.
*G06T 7/50*     (2017.01)
*G06T 7/285*    (2017.01)
*G06T 7/593*    (2017.01)

(52) U.S. Cl.
CPC ............... *G06T 7/50* (2017.01); *G06T 7/285* (2017.01); *G06T 7/593* (2017.01); *G06T 2207/10028* (2013.01); *G06T 2207/20084* (2013.01)

(58) Field of Classification Search
CPC ..... G06T 7/50; G06T 7/521; G06T 7/55–596; G06T 2207/10028; G06T 2207/20081; G06T 2207/20084; G06N 3/02–0985
See application file for complete search history.

(56) References Cited

U.S. PATENT DOCUMENTS

| 10,916,035 B1 | 2/2021 | Kroeger |
| 2018/0130210 A1 | 5/2018 | Hall |

(Continued)

FOREIGN PATENT DOCUMENTS

CN     112132972 A     12/2020

OTHER PUBLICATIONS

Eigen, David, and Rob Fergus. "Predicting Depth, Surface Normals and Semantic Labels with a Common Multi-scale Convolutional Architecture." 2015 IEEE International Conference on Computer Vision (ICCV). IEEE, 2015. (Year: 2015).*

(Continued)

*Primary Examiner* — Geoffrey E Summers
(74) *Attorney, Agent, or Firm* — Brake Hughes Bellermann LLP

(57) ABSTRACT

According to an aspect, a method for depth estimation includes receiving image data from a sensor system, generating, by a neural network, a first depth map based on the image data, where the first depth map has a first scale, obtaining depth estimates associated with the image data, and transforming the first depth map to a second depth map using the depth estimates, where the second depth map has a second scale.

21 Claims, 15 Drawing Sheets

(56) References Cited

U.S. PATENT DOCUMENTS

| | | | |
|---|---|---|---|
| 2020/0402251 A1* | 12/2020 | Ban | G06V 10/82 |
| 2021/0295599 A1* | 9/2021 | Adkinson | G06T 7/579 |
| 2022/0051425 A1* | 2/2022 | Busam | G06T 7/55 |
| 2022/0254121 A1* | 8/2022 | Xu | G06T 17/20 |

OTHER PUBLICATIONS

Sweeney, Chris, et al. "Efficient computation of absolute pose for gravity-aware augmented reality." 2015 IEEE International Symposium on Mixed and Augmented Reality. IEEE, 2015. (Year: 2015).*

Ma, Kuan, Feng Lu, and Xiaowu Chen. "Robust planar surface extraction from noisy and semi-dense 3D point cloud for augmented reality." 2016 International Conference on Virtual Reality and Visualization (ICVRV). IEEE, 2016. (Year: 2016).*

El Amin, Ahmed, and Ahmed El-Rabbany. "Monocular VO Scale Ambiguity Resolution Using an Ultra Low-Cost Spike Rangefinder." Positioning 11.04 (2020): 45. (Year: 2020).*

Chiodini, Sebastiano, et al. "Retrieving scale on monocular visual odometry using low-resolution range sensors." IEEE Transactions on Instrumentation and Measurement 69.8 (2020): 5875-5889. (Year: 2020).*

Liu, Sibo, and Lijin Fang. "Unsupervised learning for monocular depth and motion with real scale." 2020 Chinese Automation Congress (CAC). IEEE, 2020. (Year: 2020).*

Qi, Xiaojuan, et al. "GeoNet: Geometric Neural Network for Joint Depth and Surface Normal Estimation." 2018 IEEE/CVF Conference on Computer Vision and Pattern Recognition. IEEE, 2018. (Year: 2018).*

Yin, Wei, Yifan Liu, and Chunhua Shen. "Virtual Normal: Enforcing Geometric Constraints for Accurate and Robust Depth Prediction." arXiv preprint arXiv:2103.04216v4 (2021). (Year: 2021).*

R. Ranftl, K. Lasinger, D. Hafner, K. Schindler, and V. Koltun, "Towards robust monocular depth estimation: Mixing datasets for zero-shot cross-dataset transfer," IEEE Trans. Pattern Anal. Mach. Intell., 2020. (Year: 2020).*

Garg, Rahul, et al. "Learning Single Camera Depth Estimation Using Dual-Pixels." 2019 IEEE/CVF International Conference on Computer Vision (ICCV). IEEE, 2019. (Year: 2019).*

Loo, Shing Yan, et al. "DeepRelativeFusion: Dense Monocular SLAM using Single-Image Relative Depth Prediction." arXiv preprint arXiv:2006.04047v2 (2020). (Year: 2020).*

International Search Report and Written Opinion for PCT Application No. PCT/US2021/070422, mailed on Feb. 4, 2022, 15 pages.

Ye, et al., "DRM-SLAM: Towards Dense Reconstruction of Monocular Slam With Scene Depth Fusion", Neurocomputing, vol. 396, Jul. 1, 2020, pp. 76-91.

Lu, et al., "Extending Single Beam Lidar to Full Resolution by Fusing With Single Image Depth Estimation", 2020 25th International Conference on Pattern Recognition (ICPR), Jan. 10-15, 2021, pp. 6343-6350.

Khan, et al., "Deep Learning-Based Monocular Depth Estimation Methods—A State-of-the-Art Review", Sensors 2020, 2, https://www.mdpi.com/1424-8220/20/8/2272/htm, Apr. 16, 2020, 16 pages.

Xu, et al., "Direct Visual-Inertial Odometry with Semi-Dense Mapping", https://www.sciencedirect.com/science/article/abs/pii/S0045790617312119, Oct. 4, 2019, 20 pages.

Yin, et al., "DiverseDepth: Affine-invariant Depth Prediction Using Diverse Data", https://arxiv.org/abs/2002.00569, Feb. 3, 2020, 17 pages.

Office Action for Japanese Application No. 2022-509068 (with English Translation), mailed Oct. 3, 2023, 20 pages.

* cited by examiner

DEPTH ESTIMATION USING A NEURAL NETWORK

CROSS-REFERENCE TO RELATED APPLICATION

This application is a 35 U.S.C. § 371 National Phase Entry Application from PCT/US2021/070422, filed on Apr. 19, 2021, entitled "DEPTH ESTIMATION USING A NEURAL NETWORK", the disclosure of which is incorporated herein by reference in its entirety.

TECHNICAL FIELD

This description generally relates to depth estimation using a neural network

BACKGROUND

Depth estimation is a computer vision design task to estimate depth (disparity) from image data (e.g., receives an RGB image and outputs a depth image). In some conventional approaches, multiple cameras and/or physical markers in the scene are used to reconstruct a depth map from multiple views of the same scene/object. However, estimating a depth map from a single image may require extensive computation power, which, in some cases, are not well suited for mobile applications.

SUMMARY

According to an aspect, a method for depth estimation includes receiving image data from a sensor system, generating, by a neural network, a first depth map based on the image data, where the first depth map has a first scale, obtaining depth estimates associated with the image data, and transforming the first depth map to a second depth map using the depth estimates, where the second depth map has a second scale.

According to some aspects, the method may include one or more of the following features (or any combination thereof). The method includes generating, by the neural network, surface normals based on the image data, where the first depth map is transformed to the second depth map using the surface normals and the depth estimates. The method may include generating visual feature points based on the image data, the visual feature points being associated with the depth estimates. The method may include obtaining the depth estimates from a depth sensor. The depth estimates may be obtained during an augmented reality (AR) session executable by a mobile computing device. The method may include estimating affine parameters based on offsets between the first depth map and the depth estimates, where the affine parameters includes scale and shift, and the first depth map is transformed to the second depth map based on the affine parameters. The method may include predicting, by the neural network, first surface normals based on the image data, predicting second surface normals from the second depth map, computing a self-consistency loss based on the first surface normals and the second surface normals, and updating the neural network based on the self-consistency loss. The method may include estimating at least one planar region in the image data using the second depth map, where the at least one planar region is configured to be used as a surface to attach a virtual object.

According to an aspect, a depth estimation system includes a sensor system configured to obtain image data, a neural network configured to generate a first depth map based on the image data, where the first depth map has a first scale, a depth estimate generator configured to obtain depth estimates associated with the image data, and a depth map transformer configured to estimate affine parameters based on the depth estimates and the first depth map and transform the first depth map to a second depth map using the affine parameters, where the second depth map has a second scale.

According to some aspects, the depth estimation system may include one or more of the above/below features (or any combination thereof). The neural network is configured to execute on a mobile computing device. The depth estimation system may include a visual inertial motion tracker configured to generate visual feature points, the visual feature points being associated with the depth estimates. The depth estimation system may include a depth sensor configured to obtain the depth estimates. The depth estimate generator is configured to obtain the depth estimates during an augmented reality (AR) session, where the depth estimate generator is configured to also obtain pose data, a gravity direction, and identification of one or more planar regions in the image data during the AR session. The affine parameters may include scale and shift for each depth estimation in the first depth map. The depth map transformer may include a random sample consensus (RANSAC) based solver that minimizes an objective function to estimate the scale and shift. The depth estimation system may include a convolutional neural network trainer configured to predict, using the neural network, first surface normals based on the image data, predict second surface normals from the second depth map, compute a self-consistency loss based on the first surface normals and the second surface normals, compute a loss based on the first surface normals and ground truth normals, and update the neural network based on the self-consistency loss and the loss. The depth map transformer may include a plane generator configured to estimate at least one planar region in the image data using the second depth map, where the at least one planar region is configured to be used as a surface to attach a virtual object, where the plane generator includes a map converter configured to convert the second depth map to a point cloud, and a plane detector configured to detect the at least one planar region according to a plane fitting algorithm using the point cloud.

According to an aspect, a non-transitory computer-readable medium storing executable instructions that when executed by at least one processor cause the at least one processor to receive image data from a sensor system, generate, by a neural network, a first depth map based on the image data, the first depth map having a first scale, obtain depth estimates associated with the image data, transform the first depth map to a second depth map using the depth estimates, where the second depth map has a second scale, and estimate at least one planar region in the image data using the second depth map, the at least one planar region configured to be used as a surface to attach a virtual object during an augmented reality (AR) session.

The non-transitory computer-readable medium may include any of the above/below features (or any combination thereof). The executable instructions include instructions that when executed by the at least one processor cause the at least one processor to estimate affine parameters based on offsets between the first depth map and the depth estimates, where the affine parameters include scale and shift, and the first depth map is transformed to the second depth map based on the affine parameters. The depth estimates may be obtained from at least one of a visual inertial motion tracker, a depth sensor, a dual-pixel depth estimator, a motion stereo depth estimator, a sparse active depth estimator, or a precomputed sparse map. The executable instructions include instructions that when executed by the at least one processor cause the at least one processor to generate, by the neural network, surface normals based on the image data, where the first depth map is transformed to the second depth map using the surface normals and the depth estimates.

DETAILED DESCRIPTION

Figure 1A:
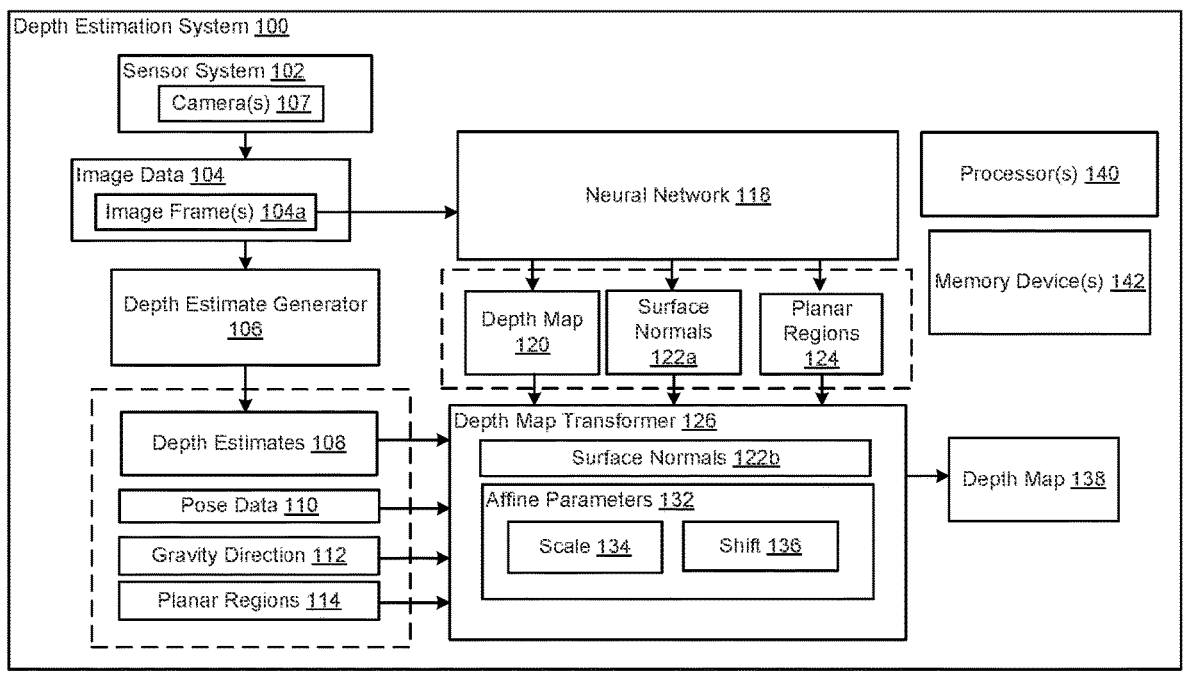
FIG. 1A illustrates a depth estimation system according to an aspect.

The embodiments provide a depth estimation system that includes a sensor system that obtains image data, and a neural network configured to generate a depth map based on an image frame of the image data (e.g., using a single image frame to generate a depth map). In some examples, the depth map generated by the neural network may be associated with a first scale (e.g., a non-metric map). The depth map generated by the neural network may be an affine-invariant depth map, which is a depth map that is up to scale/shift but is not associated with a metric scale (or Imperial numeric system). The depth estimation system includes a depth estimate generator that obtains depth estimates (e.g., depth estimates with depth values according to a second scale (e.g., a metric scale)) from one or more sources, and a depth map transformer configured to transform the depth map generated by the neural network to a depth map having a second scale (e.g., a metric scale) using the depth estimates. The first and second scales may be different scales that can be based on two different measurement systems with different standards. In some examples, a metric depth map may refer to an image where each pixel represents the metric depth value according to a metric scale (e.g., meters) for the corresponding pixel in the image. The metric depth estimates obtained by the depth estimate generator may be considered sparse depth estimates (e.g., depth estimates for some of the pixels in the image data but not all of them). In some examples, the metric depth estimates are associated with a subset of the pixels in the image data. The depth map transformer uses the sparse depth estimates to provide the second scale (e.g., the metric scale) for the depth map generated by the neural network. In some examples, the embodiments provide a system that can provide metric scale for all pixels when metric depth estimates might only exist for a sparse subset, and the dense metric depth map provides technical advantages over sparse metric depth for downstream applications (e.g., 3D reconstruction, plane finding, etc.).

The depth estimation system may provide a solution to scale/shift ambiguity (or generally referred to as affine ambiguity) in a monocular depth neural network. For example, the depth estimation system may use sparse source(s) of metric depth to resolve the affine ambiguity in monocular machine-learning (ML) depth models. Affine ambiguity may cause difficulties for some applications that require (or benefit from) real-word scales (e.g., metric scale). For example, a mobile augmented reality (AR) application may involve placing virtual objects in the camera view with real-world dimensions. To render objects at real-world scale, the depth of the surface on which a virtual object is placed may need to be estimated in metric units. According to the embodiments discussed herein, the metric depth map generated by the depth estimation system may be used to estimate planar region(s) in the image data, where the planar regions are used as surfaces to attach virtual objects.

In some conventional AR applications, surfaces are estimated in three-dimensional (3D) point clouds, but these approaches may not allow users to place virtual objects quickly (e.g., immediately) in the scene. Rather, the user scans a planar surface with sufficient texture for a sufficient amount of 3D points to be detected and subsequent plane detection, which may result in an AR session not detecting a number of planes and/or taking a relatively long time for the planes to be detected. However, by using the metric depth maps generated by the depth estimation system, the latency for detecting planar regions can be reduced. For example, the depth estimation system may reduce placement latency by predicting the scale of placed object/planar surface depth using the neural network (e.g., estimate depth from a single image or a small number of images thereby requiring less movement by the user). Furthermore, the depth estimation system may predict depth from low texture surfaces such as white tables. Also, it is noted that the metric depth maps generated by the depth estimation system may be used for a wide-variety of applications (besides AR applications) including robotics.

In some examples, the depth map transformer uses one or more other signals to assist with providing a second scale (e.g., a metric scale) for the depth map generated by the neural network. In some examples, the neural network predicts surface normals, and the depth map transformer uses the predicted surface normals along with the sparse depth estimates to provide a second scale (e.g., a metric scale) for the depth map generated by the neural network.

The accuracy of predicted depth may be improved by predicting depth and surface normals. To encourage consistency between predicted depths and surface normals, a self-consistency loss (e.g., unsupervised self-consistency loss) is used during the training or adjustment of the neural network. For example, the neural network may predict first surface normals from the RGB image, and the depth map transformer may predict second surface normals from the metric depth map. The self-consistency loss is computed based on the difference between the first surface normals and the second surface normals, and the self-consistency loss is added to the supervised loss. The supervised loss is computed based on the difference between the first surface normals and ground truth normals. The self-consistency loss encourages the network to minimize any deviation between the first surface normals and the second surface normals.

In some examples, the depth map transformer may receive a gravity direction and planar regions. The gravity direction is obtained from an accelerometer. The planar regions may be estimated by a plane generator using the visual feature points (e.g., the SLAM points) during an AR session. The depth map transformer may use the gravity direction and the planar regions (along with the sparse depth estimates) to provide a second scale (e.g., a metric scale) for the depth map generated by the neural network.

The depth map transformer may include a parameter estimator solver configured to execute a parameter estimation algorithm to estimate affine parameters (e.g., shift, scale) based on offsets between the sparse depth estimates and the depth map generated by the neural network. In some examples, the parameter estimator solver is a random sample consensus (RANSAC) based solver that solves an objective function to estimate the scale and shift. In some examples, the parameter estimator solver is configured to solve a least squares parameter estimation problem within a RANSAC loop to estimate the affine parameters for the depth map to transform it to the second scale (e.g., the metric scale).

In some examples, the neural network is considered a monocular depth neural network because the neural network predicts a depth map based on a single image frame. In some examples, the neural network includes a U-net architecture configured to predict pixel-wise depth from a red-green-blue (RGB) image. In some examples, the neural network includes features that enable the neural network to execute on a mobile computing device (e.g., a smartphone, tablet, etc.). For example, the neural network may use depth-wise separable convolutions. The depth-wise separable convolutions include factorized convolutions which factorize a standard convolution into a depthwise convolution and a 1×1 convolution referred to as a pointwise convolution. This factorization has the effect of reducing computation and model size. In some examples, the neural network may use a Blurpool encoder, which may be a combined anti-aliasing and subsampling operation that makes the network more robust and stable to corruptions such as rotation, scaling, blurring, and noise variants. In some examples, the neural network may include bilinear upsampling, which may reduce the parameters to transposed convolutions and therefore reduces the size of the network. These and other features are further explained with reference to the figures.

FIGS. 1A through 1G illustrate a depth estimation system 100 according to an aspect. The depth estimation system 100 generates a depth map 138 based on depth estimates 108 (obtained from one or more sources) and a depth map 120 generated by a neural network 118. The depth map 120 generated by the neural network 118 has a first scale. In some examples, the first scale is a non-metric scale. The depth map 138 has a second scale. The first and second scales are based on two different measurement systems with different standards. In some examples, the second scale is a metric scale. The depth estimation system 100 is configured to convert the depth map 120 having the first scale to the depth map 138 having the second scale. The depth maps 138 with the second scale may be used to control augmented reality, robotics, natural user interface technology, gaming, or other applications.

The depth estimation system 100 includes a sensor system 102 that obtains image data 104. The sensor system 102 includes one or more cameras 107. In some examples, the sensor system 102 includes a single camera 107. In some examples, the sensor system 102 includes two or more cameras 107. The sensor system 102 may include an inertial motion unit (IMU). An IMU may detect motion, movement, and/or acceleration of a computing device. The IMU may include various different types of sensors such as, for example, an accelerometer (e.g., accelerometer 121 of FIG. 1C), a gyroscope, a magnetometer, and other such sensors. The sensor system 102 may include other types of sensors such as a light sensor, an audio sensor, a distance and/or proximity sensor, a contact sensor such as a capacitive sensor, a timer, and/or other sensors and/or different combination(s) of sensors.

The depth estimation system 100 includes one or more processors 140, which may be formed in a substrate configured to execute one or more machine executable instructions or pieces of software, firmware, or a combination thereof. The processors 140 can be semiconductor-based—that is, the processors can include semiconductor material that can perform digital logic. The depth estimation system 100 can also include one or more memory devices 142. The memory devices 142 may include any type of storage device that stores information in a format that can be read and/or executed by the processor(s) 140. The memory devices 142 may store applications and modules that, when executed by the processor(s) 140, perform any of the operations discussed herein. In some examples, the applications and modules may be stored in an external storage device and loaded into the memory devices 142.

The neural network 118 is configured to generate a depth map 120 based on the image data 104 captured by the sensor system 102. In some examples, the neural network 118 receives an image frame 104a of the image data 104 and generates the depth map 120 based on the image frame 104a. The image frame 104a is a red-green-blue (RGB) image. In some examples, the neural network 118 generates a depth map 120 using a single image frame 104a. In some examples, the neural network 118 generates a depth map 120 using two or more image frames 104a. The depth map 120 generated by the neural network 118 may be an affine-invariant depth map, which is a depth map that is up to scale/shift but is not associated with a first scale (e.g., a metric scale). A depth map 120 may refer to an image where each pixel represents the depth value according to a non-metric scale (e.g., 0 to 1) for the corresponding pixel in the image. The non-metric scale may be a scale that is not based on the metric system, the international system of units (SI), or the imperial system of measurement. Although the embodiments are described with reference to metric scale (or metric value) and non-metric scale (or non-metric scale), the first and second scale can be based on any two different measurement systems with different standards. The depth map 120 may be used to describe an image that contains information relating to the distance from a camera viewpoint to the surface of an object in the scene. The depth value is inversely related to the distance from a camera viewpoint to the surface of an object in the scene.

The neural network 118 may be any type of deep neural network configured to generate a depth map 120 using one or more image frames 104a (or a single image frame 104a). In some examples, the neural network 118 is a convolutional neural network. In some examples, the neural network 118 is considered a monocular depth neural network because the neural network 118 predicts a depth map 120 based on a single image frame 104a. The neural network 118 is configured to predict pixel-wise depth from the image frame 104a. In some examples, the neural network 118 includes a U-net architecture, e.g., an encoder-decoder with skip connections with learnable parameters.

In some examples, the neural network 118 has a size that is able to execute on a mobile computing device (e.g., a smartphone, tablet, etc.). In some examples, the size of the neural network 118 is less than 150 Mb. In some examples, the size of the neural network 118 is less than 100 Mb. In some examples, the size of the neural network 118 is around 70 Mb or less than 70 Mb. In some examples, the neural network 118 uses depth-wise separable convolutions, which is a form of factorized convolutions that factorize a standard convolution into a depthwise convolution and a 1×1 convolution referred to as a pointwise convolution. This factorization may have the effect of reducing computation and model size. In some examples, the neural network 118 may use a Blurpool encoder, which may be a combined anti-aliasing and subsampling operation that makes the network more robust and stable to corruptions such as rotation, scaling, blurring, and noise variants. In some examples, the neural network 118 may include bilinear upsampling, which may reduce the parameters to transposed convolutions and therefore reduces the size of the network.

In some examples, the neural network 118 also predicts surface normals 122a that describe surface orientation of the image frame 104a (e.g., all visible surfaces in the scene). In some examples, the surface normals 122a include per-pixel normals or per-pixel surface orientation. In some examples, surface normals 122a include surface normal vectors. A surface normal 122a for a pixel in an image may be defined as a three dimensional vector corresponding to orientation of the 3D surface represented by that pixel in the real world. The orientation of the 3D surface is represented by a directional vector perpendicular to the real world 3D surface. The surface normals 122aIn some examples, the neural network 118 is also configured to detect planar regions 124 within the image frame 104a. The planar regions 124 may include vertical and/or horizontal planes.

The depth estimation system 100 includes a depth estimate generator 106 that obtains depth estimates 108 (e.g., metric depth estimates) associated with the image data 104. The depth estimates 108 may include depth values in a metric scale for some of the pixels in the image data 104. For example, the metric scale may refer to any type of measurement system such as the metric system and/or the imperial system. The depth estimates 108 obtained by the depth estimate generator 106 may be considered sparse depth estimates (e.g., depth estimates for some of the pixels in the image data but not all of them). For example, if an image frame 104a is 10×10, the image frame 104a includes one hundred pixels. However, the depth estimates 108 may include depth estimates in a metric scale for a subset of the pixels. In contrast, a dense depth map (e.g., depth map 120) provides depth values (e.g., non-metric depth values) for a large number of pixels in the image or all of the pixels in the image).

The depth estimate generator 106 may be any type of component configured to generate (or obtain) depth estimates 108 based on the image data 104. In some examples, the depth estimate generator 106 also obtains pose data 110 and identifies planar regions 114 within the image data 104. The pose data 110 may identify a pose (e.g., position and orientation) of a device that executes the depth estimation system 100 (e.g., a smartphone that has the depth estimation system 100). In some examples, the pose data 110 includes a five degree-of-freedom (DoF) position of the device. In some examples, the pose data 110 includes a six DoF position of the device. In some examples, the depth estimate generator 106 includes a plane generator 123 configured to detect planar regions 114 within the image data 104 using any type of planar detection algorithm (or plane fitting algorithm). A planar region 114 may be a planar surface of an object (e.g., table, wall, etc.) within the image data 104.

Figure 1B:
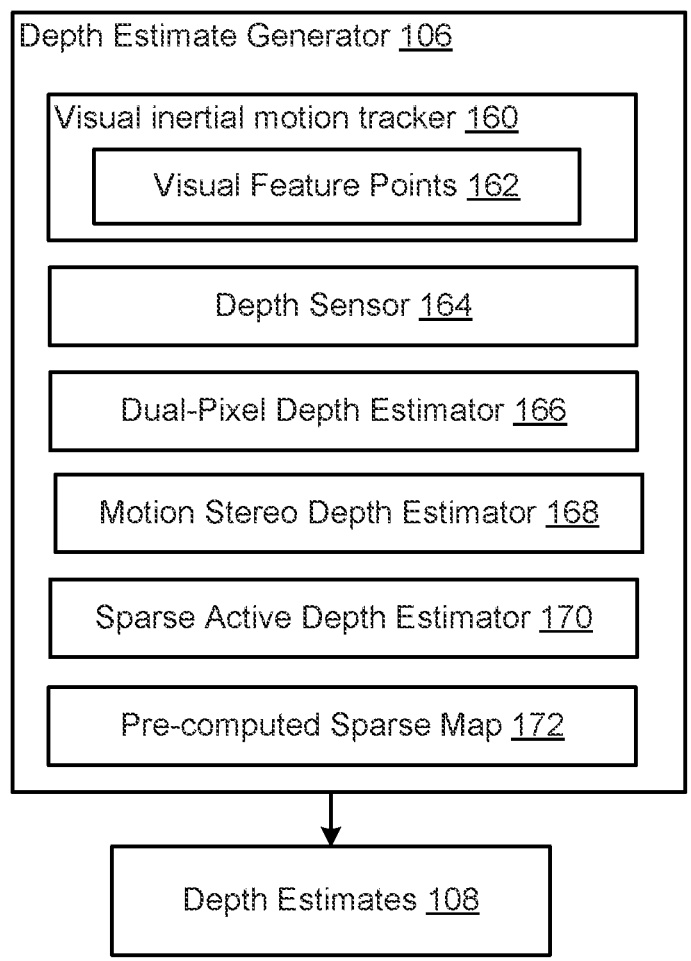
FIG. 1B illustrates a depth estimate generator that obtains depth estimates according to an aspect.

Referring to FIG. 1B, the depth estimate generator 106 may include a visual inertial motion tracker 160, a depth sensor 164, a motion stereo depth estimator 168, a sparse active depth estimator 170, and/or a pre-computed sparse map 172. Each of the components of the depth estimate generator 106 may represent a separate source for obtaining depth estimates 108. For example, each component may independently generate depth estimates 108, where the depth estimate generator 106 may include one component or multiple components. In some examples, the depth estimate generator 106 may include one source, e.g., one of the visual inertial motion tracker 160, the depth sensor 164, the dual-pixel depth estimator 166, the motion stereo depth estimator 168, the sparse active depth estimator 170, or the pre-computed sparse map 172. In some examples, if the depth estimate generator 106 includes multiple sources (e.g., multiple components), the depth estimate generator 106 may select one of the sources for use in generating the depth map 138. In some examples, if the depth estimate generator 106 includes multiple sources (e.g., multiple components), the depth estimate generator 106 may multiple sources for use in generating the depth map 138.

Figure 1C:
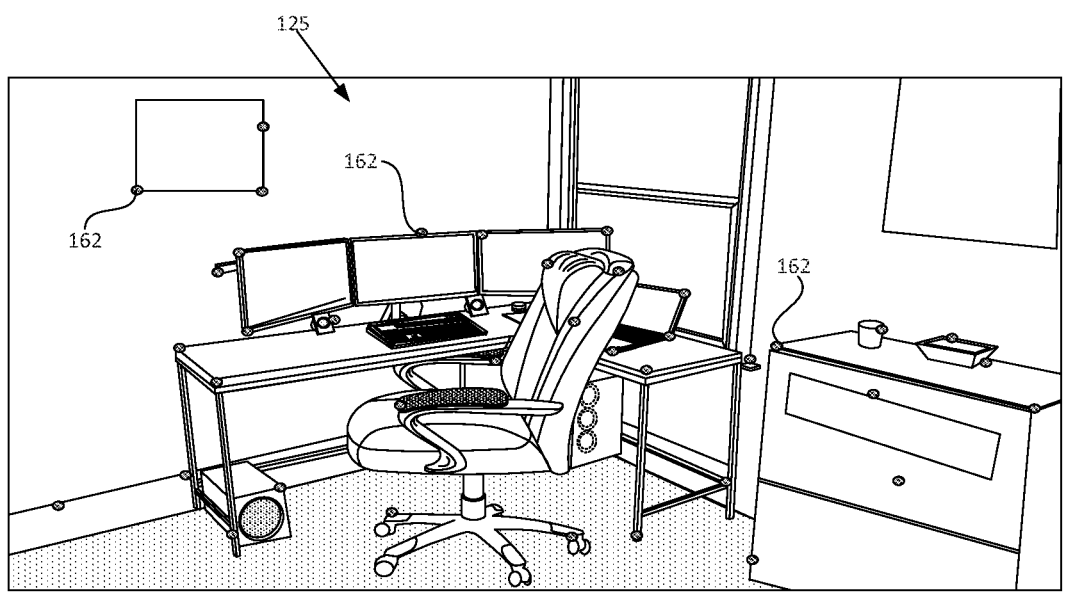
FIG. 1C illustrates an example of visual feature points in image data according to an aspect.

The visual inertial motion tracker 160 is configured to generate visual feature points 162 that represent the image data 104. The visual feature points 162 are associated with depth estimates 108. For example, each visual feature point 162 may include a depth value in a metric scale. FIG. 1C illustrates a scene 125 captured by the camera 107, where the scene 125 depicts visual feature points 162 generated by the visual inertial motion tracker 160 using the image data 104. A visual feature point 162 may include a depth value in a metric scale, where the depth value is inversely related to the distance from a camera viewpoint to the surface of an object in the scene 125.

The visual feature points 162 are a plurality of points (e.g., interesting points) in 3D space that represent the user's environment. In some examples, each visual feature point 162 includes an approximation of a fixed location and orientation in 3D space, and the visual feature points 162 may be updated over time. For example, the user may move her mobile phone's camera around a scene 125 during an AR session 174, where the visual inertial motion tracker 160 may generate visual feature points 162 that represent the scene 125. In some examples, the visual feature points 162 include simultaneous localization and mapping (SLAM) points. In some examples, the visual feature points 162 are referred to as a point cloud. In some examples, the visual feature points 162 are referred to as feature points. In some examples, the visual feature points 162 are referred to 3D feature points. In some examples, the visual feature points 162 are in a range of 200-400 per image frame 104a.

Referring back to FIG. 1B, in some examples, the visual inertial motion tracker 160 is configured to execute a SLAM algorithm which is a tracking algorithm that can estimate the movement of a device (e.g., the smartphone) in space by using the camera 107. In some examples, the SLAM algorithm is also configured to detect the planar regions 114. In some examples, the SLAM algorithm iteratively calculate the position and the orientation (e.g., pose data 110) of the device by analyzing the key points (e.g., visual feature points 162) and descriptors of each image and tracking these descriptors from frame to frame, which can allow for a 3D reconstruction of the environment.

The depth sensor 164 is configured to generate the depth estimates 108 based on the image data 104. In some examples, the depth sensor 164 includes a light detection and ranging (LiDAR) sensor. The dual-pixel depth estimator 166 uses a machine learning model to estimate depth from the camera's dual-pixel auto-focus system. Dual-pixels operate by splitting every pixel in half, such that each half pixel views a different half of the main lens' aperture. By reading out each of these half-pixel images separately, two slightly different views of the scene are obtained, and these different views are used by the dual-pixel depth estimator 166 to generate the depth estimates 108. The motion stereo depth estimator 168 may use multiple images in a stereo-matching algorithm for generating the depth estimates 108. In some examples, a single camera may be moved around a scene 125 to capture multiple images, where these images are used to stereo match to estimate a metric depth. The sparse active depth estimator 170 may include a sparse time of flight estimator or sparse phase detection autofocus (PDAF) estimator. In some examples, the pre-computed sparse map 172 is a sparse map used by a visual positioning service.

Referring back to FIG. 1A, the depth estimation system 100 includes a depth map transformer 126 configured to transform the depth map 120 generated by the neural network 118 to a depth map 138 using the depth estimates 108. A depth map 138 may refer to an image where each pixel represents the depth value according to a metric scale (e.g., meters) for the corresponding pixel in the image data 104. The depth map transformer 126 is configured to use the depth estimates 108 to provide a metric scale for the depth map 120 generated by the neural network 118.

The depth map transformer 126 is configured to estimate affine parameters 132 based on the depth map 120 generated by the neural network 118 and the depth estimates 108. The affine parameters 132 include scale 134 and shift 136 of the depth map 120. The scale 134 includes a scale value that indicates the amount of resizing of the depth map 120. The shift 136 includes a shift value indicating the amount that the pixels of the depth map 120 are shifted. It is noted that the scale 134 (or scale value) refers to the amount of sizing, which is completely different from the above-recited "first scale" and "second scale" which refers to different measuring systems (e.g., first scale may be a non-metric scale and second scale may be a metric scale). The depth map transformer 126 is configured to transform the depth map 120 to the depth map 138 using the affine parameters 132. In some examples, the scale 134 and the shift 136 include two numbers (e.g., s=scale, t=shift) which when multiplied and added to the value in each pixel at depth map 120 produce depth map 138 (e.g., D138 (x, y)=s*D120 (x, y)+t, where D120(x, y) is the value in depth map 120 at the pixel location (x, y)). The affine parameters 132 can be estimated from a sparse set of depth estimates 108 and then applied to every pixel in the depth map 120 using the above equation. As depth map 120 has valid depth for all pixels, depth map 138 will also have metrical scale for all.

The depth map transformer 126 is configured to execute a parameter estimation algorithm to solve an optimization problem (e.g., an objective function) which minimizes an objective of aligning the depth estimates 108 with the depth map 120. In other words, the depth map transformer 126 is configured to minimize an objective function of aligning the depth estimates 108 with the depth map 120 to estimate the affine parameters 132. For example, as indicated above, the depth estimates 108 obtained by the depth estimate generator 106 may be considered sparse depth estimates (e.g., depth estimates for some of the pixels in the image data 104 but not all of them). For example, if an image frame 104a is 10×10, the image frame 104a includes one hundred pixels. The depth estimates 108 may include depth estimates in a metric scale for a subset of the pixels in the image frame 104a (e.g., some number less than one hundred in the example of the 10×10 image). However, the depth map 120 includes a depth value for each pixel in the image, where the depth value is a non-metric unit such as a number between zero and one. For each pixel that has a metric depth estimate 108 (e.g., a metric depth value), the depth map transformer 126 may obtain the corresponding depth value in the depth map 120 (e.g., non-metric depth value) and use the metric depth value and the non-metric depth value to estimate the scale 134 and the shift 136, which may include minimizing the error when scale 134 times the non-metric depth value plus shift 136 minus the metric depth value is zero. In some examples, the depth map transformer 126 is configured to solve a least squares parameter estimation problem within a random sample consensus (RANSAC) loop to estimate the affine parameters 132.

Figure 1D:
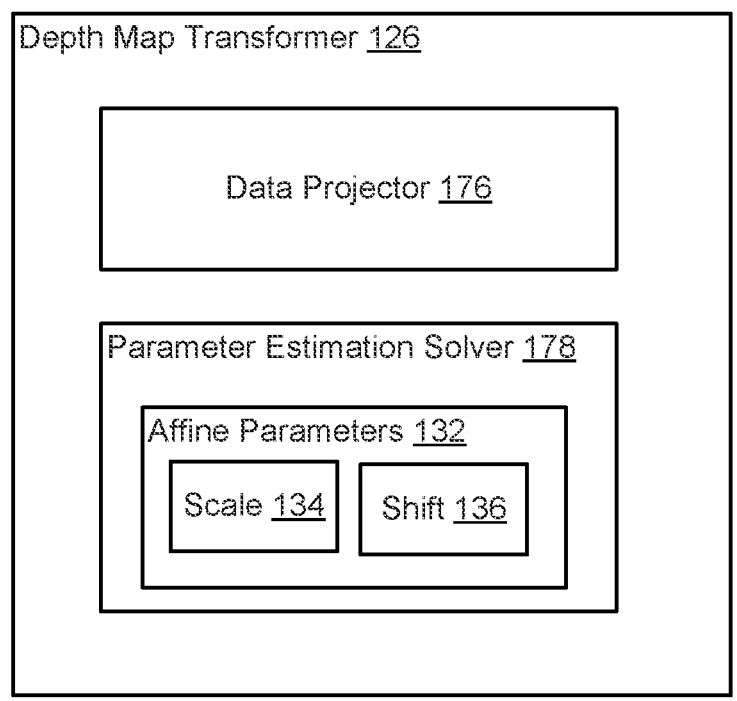
FIG. 1D illustrates a depth map transformer according to an aspect.

Referring to FIG. 1D, the depth map transformer 126 may include a data projector 176 configured to project the depth estimates 108 onto the depth map 120. If the depth estimates 108 include the visual feature points 162, the data projector 176 projects the visual feature points 162 onto the depth map 120. The depth map transformer 126 may include a parameter estimation solver 178 configured to solve an optimization problem to estimate the affine parameters 132 (e.g., scale 134, shift 136) in which the optimization problem minimizes an objective of aligning the depth estimates 108 with the depth map 120. In some examples, the parameter estimation solver 178 includes a RANSAC based parameter estimation algorithm. In some examples, the parameter estimation solver 178 is configured to solve a least squares parameter estimation problem within a RANSAC loop to estimate the affine parameters 132.

Figure 1E:
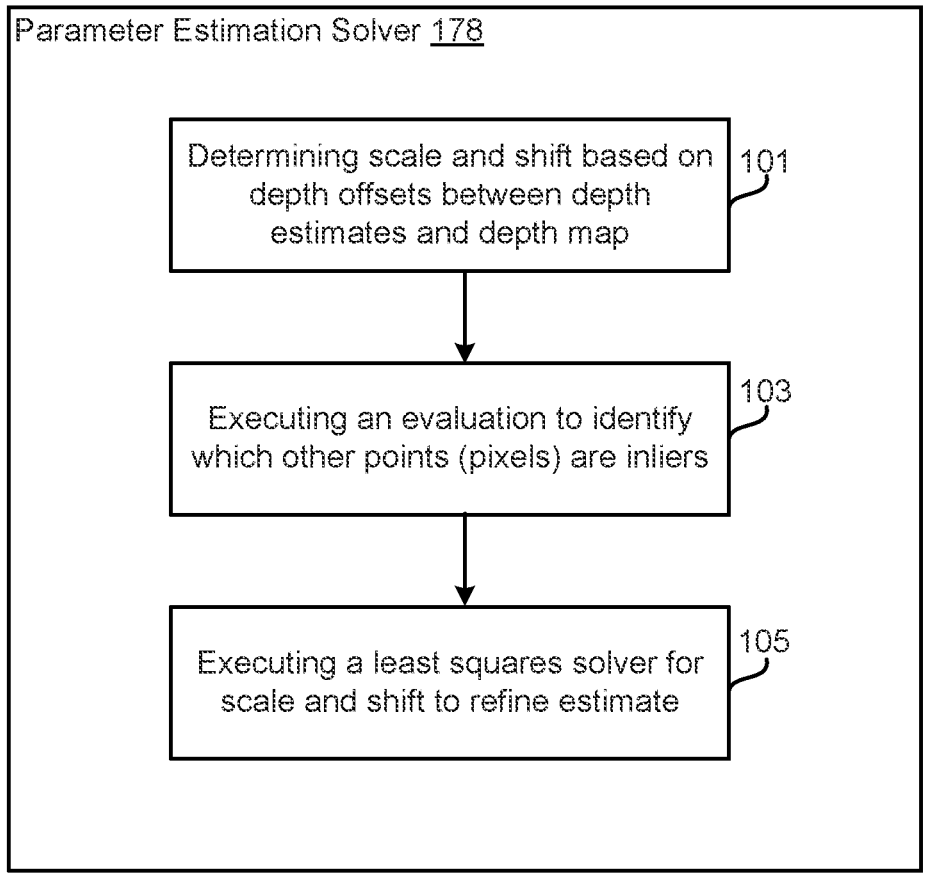
FIG. 1E illustrates example operations of a parameter estimation solver of the depth map transformer according to an aspect.

FIG. 1E illustrates example operations of the parameter estimation solver 178. In operation 101, the parameter estimation solver 178 determines scale 134 and shift 136 based on depth offsets between the depth estimates 108 and the depth map 120. The parameter estimation solver 178 computes the scale 134 (e.g., the scale for inverse depth) and the shift 136 (e.g., the shift for inverse) using any two points in the depth estimates 108 and the depth map 120 based on the following equations:

$$k = \frac{(l_i - l_j)}{(d_i - d_j)} \quad \text{Eq. (1)}$$

$$c = l_i - kd_i \quad \text{Eq. (2)}$$

The parameter k indicates the scale 134, and the parameter c indicates the shift 136. The parameter $l_i$ is the inverse depth (e.g., the metric depth value) for the $i^{th}$ estimate (which corresponds to the $i^{th}$ depth prediction). The parameter $d_i$ is the inverse depth (e.g., the non-metric depth value) for the $i^{th}$ depth prediction. The parameter h is the inverse depth (e.g., the metric depth value) for the $j^{th}$ estimate (which corresponds to the $j^{th}$ depth prediction). The parameter $d_j$ is the inverse depth (e.g., the non-metric depth value) for the $j^{th}$ depth prediction. For instance, $l_i$ and $l_j$ may represent the metric depth values for two points (e.g., two pixels) in the depth estimates 108, and $d_i$ and $d_j$ may represent the non-metric depth values for the corresponding two points (e.g., two pixels) in the depth map 120.

In operation 103, the parameter estimation solver 178 executes an evaluation method to identify which other points (e.g., pixels) are inliers of the above solution (e.g., Eq. (1) and Eq. 2)) based on the following equation:

$$e=(d_i-l_i)^2, \qquad \text{Eq. (3)}$$

where e<t, and t is the inlier threshold (e.g., the RANSAC inlier threshold). For example, for a particular point (e.g., pixel) having a non-metric depth value and a metric depth value, the parameter estimation solver 178 obtains the non-metric depth value ($d_i$) and the metric depth value ($l_i$), and if the squared difference is less than the inlier threshold, that point is identified as an inlier.

In operation 105, the parameter estimation solver 178 is configured to execute a least squares solver for the scale 134 (k) and the shift 136 (c) to refine the estimate from the consensus estimate from the evaluation method.

Referring back to FIG. 1A, the depth map transformer 126 may use one or more other signals to assist with providing a metric scale for the depth map 120 generated by the neural network 118. In some examples, the neural network 118 may predict surface normals 122a, and the depth map transformer 126 may use the predicted surface normals 122a along with the depth estimates 108 to determine a metric scale for the depth map 120 generated by the neural network 118. For example, the depth map transformer 126 may predict surface normals 122b from the depth map 138 and use the offset between the surface normals 122b predicted from the depth map 138 and the surface normals 122a predicted from the neural network 118 to assist with determining the affine parameters 132. For example, the depth map transformer 126 may minimize the objective function which can penalize the offset between the depth map 120 and the depth estimates 108 and the offset between the surface normals 122a predicted from the neural network 118 and the surface normals 122b predicted from the depth map 138.

Figure 1F:
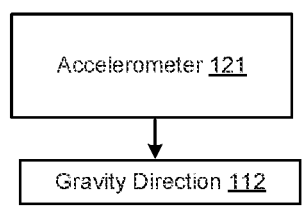
FIG. 1F illustrates an accelerometer that obtains a gravity direction according to an aspect.
Figure 1G:
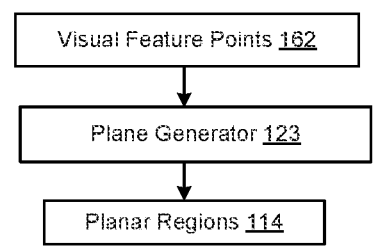
FIG. 1G illustrates a plane generator configured to detect one or more planar regions using visual feature points according to an aspect.

In some examples, the depth map transformer 126 receives a gravity direction 112 and/or planar regions 114. The depth map transformer 126 is configured to use the gravity direction 112 and the planar regions 114 (along with the depth estimates 108) to provide a metric scale for the depth map 120 generated by the neural network 118. As shown in FIG. 1F, the gravity direction 112 may be obtained from an accelerometer 121. The planar regions 114 may be detected from the image data 104. In some examples, as shown in FIG. 1G, the planar regions 114 may be estimated by a plane generator 123 using the visual feature points 162 (e.g., the SLAM points). For example, the plane generator 123 may execute a plane detection algorithm (or plane fitting algorithm) that detects planar regions 114 in the image data 104. Using the gravity direction 112 and the planar regions 114, the depth map transformer 126 may minimize the objective function which can penalize the surface normals 122b in the horizontal surface regions to match the gravity direction 112 (or opposite of gravity direction 112 depending on the coordinate system).

Figure 1H:
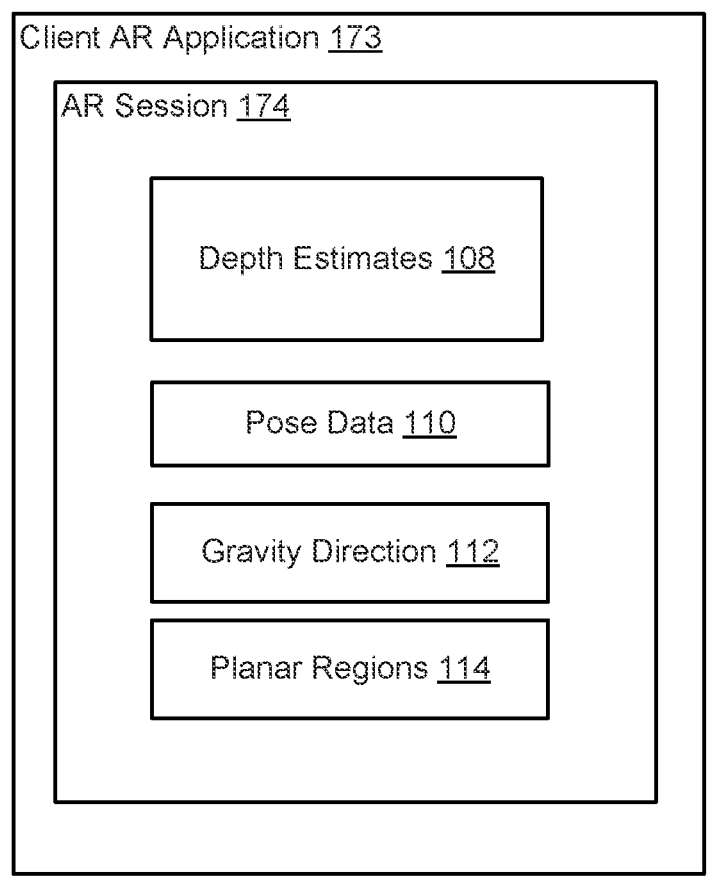
FIG. 1H illustrates examples of information captured during an augmented reality (AR) session.

As shown in FIG. 1H, the depth estimates 108, the pose data 110, the gravity direction 112, and the planar regions 114 may be obtained during an AR session 174 executable by a client AR application 173. The AR session 174 may be initiated when a user has created or joined a multi-person AR collaborative environment as further discussed in FIG. 4. The client AR application 173 may be installed on (and executable by) a mobile computing device. In some examples, the client AR application 173 is a software development kit (SDK) that operates in conjunction with one or more AR applications. In some examples, in combination with other components of the depth estimation system 100 (e.g., the depth estimate generator 106, the sensor system 102, etc.), the client AR application 173 is configured to detect and track a device's position relative to the physical space to obtain the pose data 110, detect the size and location of different types of surfaces (e.g., horizontal, vertical, angled) to obtain the planar regions 114, obtain a gravity direction 112 from the accelerometer 121, and generate the depth estimates 108 (e.g., the visual feature points 162). During the AR session 174, users can add virtual objects to the scene 125, and then multiple users can then join the AR environment to view and interact with these virtual objects simultaneously from different positions in a shared physical space.

Figure 1I:
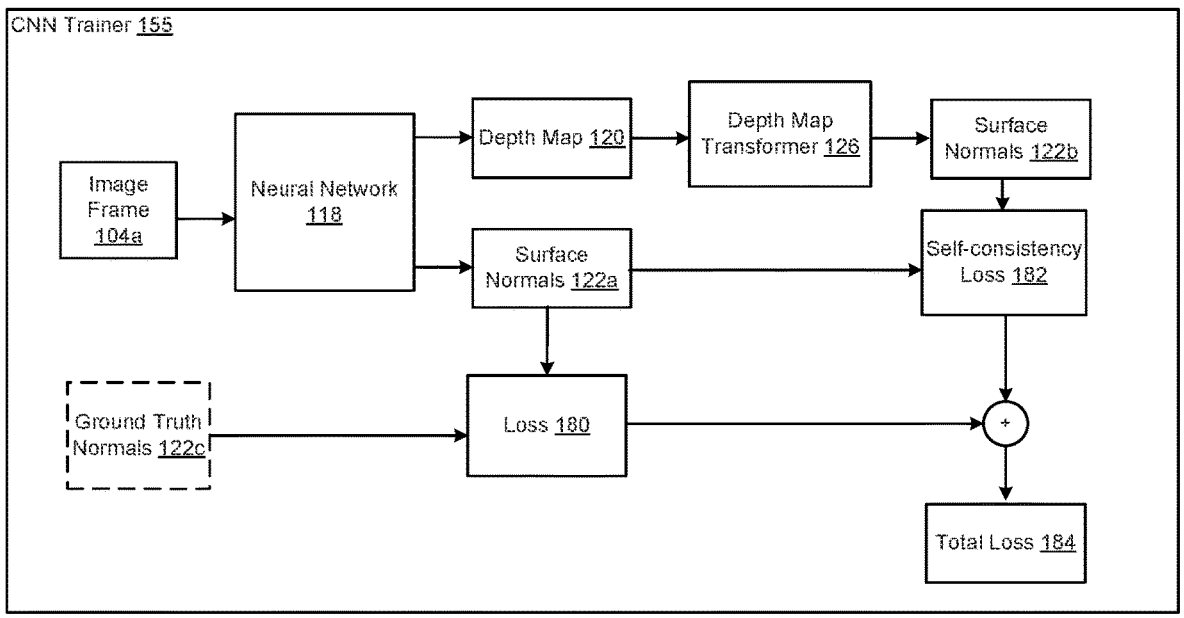
FIG. 1I illustrates a neural network trainer according to an aspect.

As shown in FIG. 1I, the depth estimation system 100 may include a convolutional neural network (CNN) trainer 155 configured to train or update the neural network 118. In some examples, the accuracy of the depth map 138 may be improved by predicting depth and surface normals 122a. Surface normals may be viewed as a higher order structural prior, since all pixels belonging to the same 3D plane will have the same normal but not necessarily the same depth. Therefore, by training neural network 118 to also predict surface normals 122a, the neural network 118 is trained to reason/infer higher order knowledge about planes in the scene 125. This may result in smoother depth for planar regions in the scene 125, where virtual objects are usually placed.

To encourage consistency between predicted depths and surface normals 122a, a self-consistency loss 182 (e.g., unsupervised self-consistency loss) is used during the training of the neural network 118. For example, the neural network 118 predicts the depth map 120 and the surface normals 122a from the image frame 104a, and the depth map transformer 126 predicts the surface normals 122b from the depth map 138. The self-consistency loss 182 is computed based on the difference between the surface normals 122a and the surface normals 122b. A loss 180 (e.g., supervised loss) is computed based on the difference between the surface normals 122a and ground truth normals 122c. A total loss 184 is computed based on the loss 180 and the self-consistency loss 182 (e.g., the loss 180 is added to the self-consistency loss 182). The self-consistency loss 182 encourages the neural network 118 to minimize any deviation between the surface normals 122a and the surface normals 122b.

Figure 2:
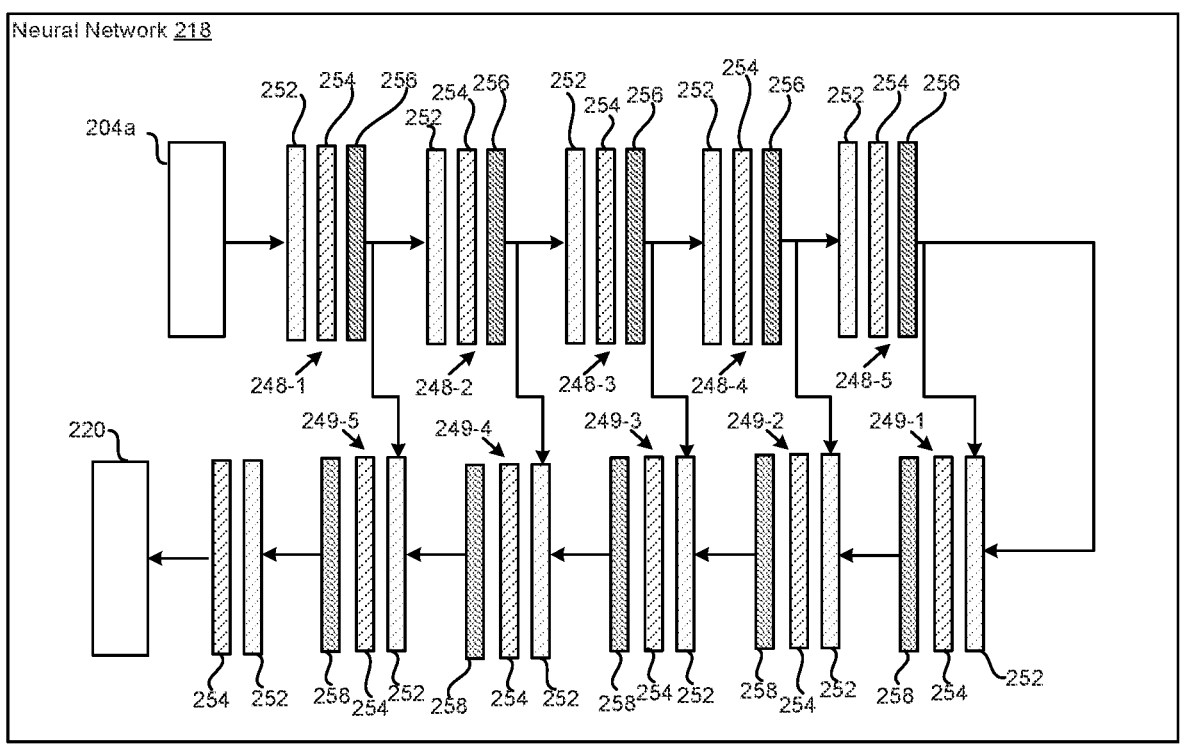
FIG. 2 illustrates a neural network according to an aspect.

FIG. 2 illustrates an example of a neural network 218. The neural network 218 may be an example of the neural network 118 of FIGS. 1A through 1I and may include any of the details discussed with reference to those figures. In some examples, the neural network 218 is a convolutional neural network. The neural network 218 receives an image frame 204a and generates a depth map 220. The depth map 220 may be an example of the depth map 120 of FIGS. 1A through 1I and may include any of the details discussed with reference to those figures. Also, in some examples, the neural network 218 is configured to predict surface normals (e.g., surface normals 122a of FIGS. 1A through 1I) and planar regions 124 (e.g., planar regions 124 of FIGS. 1A through 1I). In some examples, the neural network 218 includes a U-net architecture configured to predict pixel-wise depth from a red-green-blue (RGB) image, where the U-net architecture is an encoder-decoder with skip connections with learnable parameters.

The neural network 118 may include a plurality of downsampler units such as downsampler unit 248-1, downsampler unit 248-2, downsampler unit 248-3, downsampler unit 248-4, and downsampler unit 248-5, and a plurality of upsampler units such as upsampler unit 249-1, upsampler unit 249-2, upsampler unit 249-3, upsampler unit 249-4, and upsampler unit 249-5. Each downsampler unit (e.g., 248-1, 248-2, 248-3, 248-4, 248-5) includes a depth-wise separable convolution 252, a rectified linear activation function (ReLU) 254 and a maximum pooling operation 256. Each upsampler unit (e.g., 249-1, 249-2, 249-3, 249-4, 249-5) includes a depth-wise separable convolution 252, a rectified linear activation function (ReLU) 254 and a bilinear upsampling operation 258. The output of the last upsampler unit (e.g., 249-5) is provided to a depth-wise separable convolution 252 followed by a rectified linear activation function (ReLU).

The depth-wise separable convolution 252 includes a factorized convolution which factorizes a standard convolution into a depthwise convolution and a 1×1 convolution referred to as a pointwise convolution. This factorization has the effect of reducing computation and model size. Also, the use of the bilinear upsampling operation 258 may reduce the parameters to transposed convolutions and therefore reduces the size of the network. In some examples, the neural network 218 may use a Blurpool encoder, which may be a combined anti-aliasing and subsampling operation that makes the neural network 218 more robust and stable to corruptions such as rotation, scaling, blurring, and noise variants.

Figure 3:
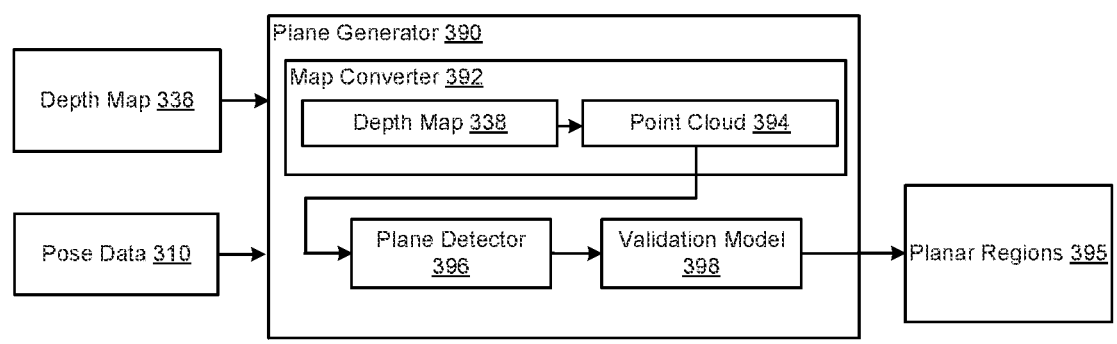
FIG. 3 illustrates a plane generator configured to detect one or more planar regions in image data from a metric depth map according to an aspect.

FIG. 3 illustrates an example of a plane generator 390 that uses a metric depth map 338 to detect or identify one or more planar regions 395 (e.g., metric planar region(s)). For example, the location and size of the planar region 395 may be identified by information according to a metric scale. In some examples, the plane generator 390 is included within the depth estimation system 100 of FIGS. 1A through 1I and may include any of the details discussed with reference to those figures. A metric planar region may be a planar surface of an object within an image with a metric scale. In some examples, the plane generator 390 may receive the metric depth map 338 and the pose data 310 and detect one or more planar regions 395 from the metric depth map 338.

As indicated above, affine ambiguity may cause difficulties for some applications that require (or benefit from) real-word scales. For example, a mobile AR application may involve placing virtual objects in the camera view with real-world dimensions. However, to render objects at real-world scale, it may be required to estimate the depth of the surface on which a virtual object is placed in metric units. According to the embodiments discussed herein, the metric depth map 338 (e.g., generated by the depth estimation system 100 of FIGS. 1A through 1I) may be used to estimate at least one planar region 395 in the image data, where the at least one planar region 395 is configured to be used as a surface to attach a virtual object. By using the metric depth maps 338, the latency for detecting planar regions 395 can be reduced. For example, the depth estimation system (e.g., depth estimation system 100 of FIGS. 1A through 1I) may reduce placement latency by predicting the scale of placed object/planar surface depth using the convolutional neural network (e.g., estimate depth from a single image or a small number of images thereby requiring less movement by the user). Furthermore, the depth estimation system may predict depth from low texture surfaces such as white tables.

The plane generator 390 may include a map converter 392 configured to convert the metric depth map 338 to a point cloud 394. The plane generator 390 may include a plane detector 396 that executes a plane fitting algorithm configured to detect one or more planar regions 395 using the point cloud 394. The plane generator 390 includes a validation model 398 configured to process the planar regions 395, which may reject one or more planar regions 395 based on visibility and other constraints.

Figure 4:
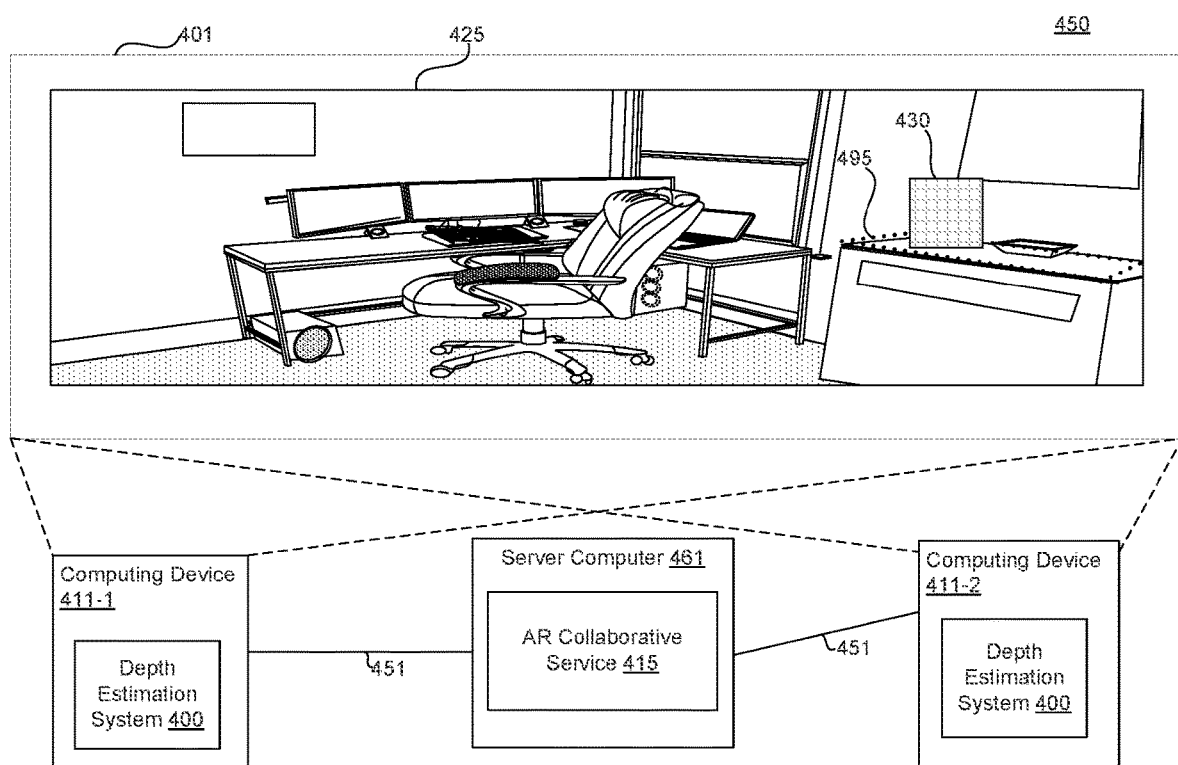
FIG. 4 illustrates an AR system having a depth estimation system according to an aspect.

FIG. 4 illustrates an AR system 450 according to an aspect. Referring to FIG. 4, the AR system 450 includes a first computing device 411-1 and a second computing device 411-2 in which a user of the first computing device 411-1 and a user of the second computing device 411-2 can view and interact with one or more virtual objects 430 included in a shared AR environment 401. Although FIG. 4 illustrates two computing devices, the embodiments encompass any number of computing devices (e.g., more than two) that can join the shared AR environment 401. The first computing device 411-1 and the second computing device 411-2 are configured to communicate, via one or more application programming interfaces (APIs), with an AR collaborative service 415 executable by a server computer 461.

The AR collaborative service 415 is configured to create a multi-user or collaborative AR experience that users can share. The AR collaborative service 415 communicates, over a network 451, with a plurality of computing devices including the first computing device 411-1 and the second computing device 411-2, where a user of the first computing device 411-1 and a user of the second computing device 411-2 may share the same AR environment 401. The AR collaborative service 415 may allow users to create 3D maps for creating multiplayer or collaborative AR experiences that users can share with other users. Users can add virtual objects 430 to a scene 425, and then multiple users can view and interact with these virtual objects 430 simultaneously from different positions in a shared physical space.

The first computing device 411-1 and/or the second computing device 411-2 may be any type of mobile computing system such as a smartphone, a tablet, a laptop, wearable device, etc. A wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device includes smartglasses. Smartglasses is an optical head-mounted display device designed in the shape of a pair of eyeglasses. For example, smartglasses are glasses that add information alongside what the wearer views through the glasses.

The AR environment 401 may involve a physical space which is within the view of a user and a virtual space within which one or more virtual objects 430 are positioned. The virtual object 430 illustrated in FIG. 4 is shown as a box but may include any type of virtual object that the user adds. Providing (or rendering) the AR environment 401 may then involve altering the user's view of the physical space by displaying the virtual objects 430 such that they appear to the user to be present in, or overlayed onto or into, the physical space in the view of the user. The displaying of the virtual objects 430 is therefore according to a mapping between the virtual space and the physical space. Overlaying the virtual objects 430 may be implemented, for example, by superimposing the virtual objects 430 into an optical field of view of a user of the physical space, by reproducing a view of the user of the physical space on one or more display screens, and/or in other ways, for example by using heads up displays, mobile device display screens and so forth.

The first computing device 411-1 and/or the second computing device 411-2 includes a depth estimation system 400. The depth estimation system 400 is an example of the depth estimation system 100 of FIGS. 1A through 1I and may include any of the details discussed with reference to those figures. The depth estimation system 400 uses image data captured by the first computing device 411-1 to generate a metric depth map, and the metric depth map is used to detect one or more planar regions 495 according to any of the techniques discussed above. In some examples, the planar regions 495 may be visually illustrated to the user so that the user can view a planar region 495 so that the user can attach a virtual object 430 to the planar region 495. For example, the user of the first computing device 411-1 may use the planar region 495 to attach a virtual object 430. When the second computing device 411-2 enters the same physical space, the AR collaborative service 415 may render the AR environment 401 into the screen of the second computing device 411-2, where the user can view and interact with the virtual object 430 that was added by the user of the first computing device 411-1. The second computing device 411-2 may include a depth estimation system 400 configured to generate a metric depth map and use the metric depth map to detect one or more planar regions 495, where the user of the second computing device 411-2 may add one or more other virtual objects 430 to the detected planar regions 495, in which the user of the first computing device 411-1 would be able to view and interact with.

Figure 5:
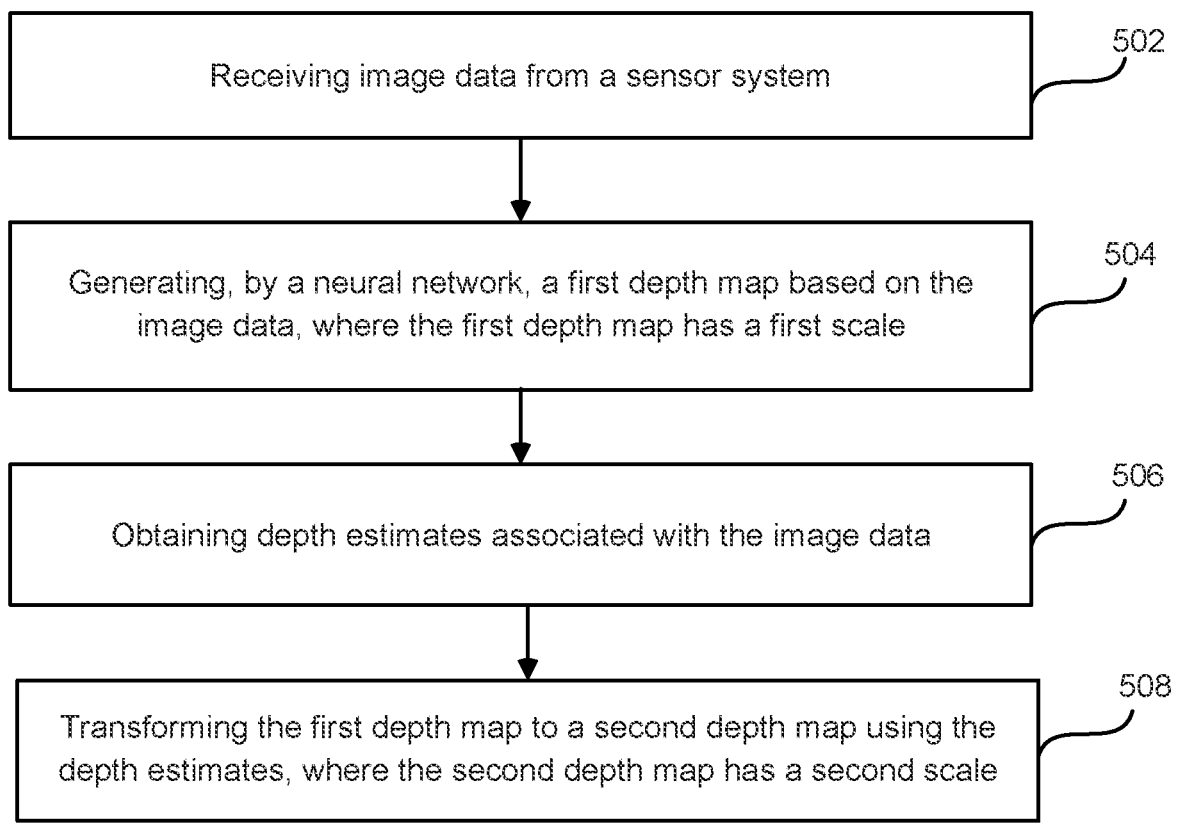
FIG. 5 illustrates a flowchart depicting example operations of a depth estimation system according to an aspect.

FIG. 5 illustrates a flowchart 500 depicting example operations of a depth estimation system. Although the operations are described with reference to the depth estimation system 100 of FIGS. 1A through 1I, the operation of FIG. 5 may be applicable to any of the systems described herein. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

Operation 502 includes receiving image data 104 from a sensor system 102. Operation 504 includes generating, by a neural network 118, a depth map 120 (e.g., a first depth map) based on the image data 104, where the depth map 120 has a first scale. Operation 506 includes obtaining depth estimates 108 associated with the image data 104. Operation 508 includes transforming the depth map 120 to a depth map 138 (e.g., a second depth map) using the depth estimates 108, where the depth map 138 has a second scale. The first and second scales are different scales that can be based on two different measurement systems with different standards. In some examples, the first scale is a non-metric scale. In some examples, the second scale is a metric scale. Also, the depth estimates 108 have depth values corresponding to the second scale.

Figure 6:
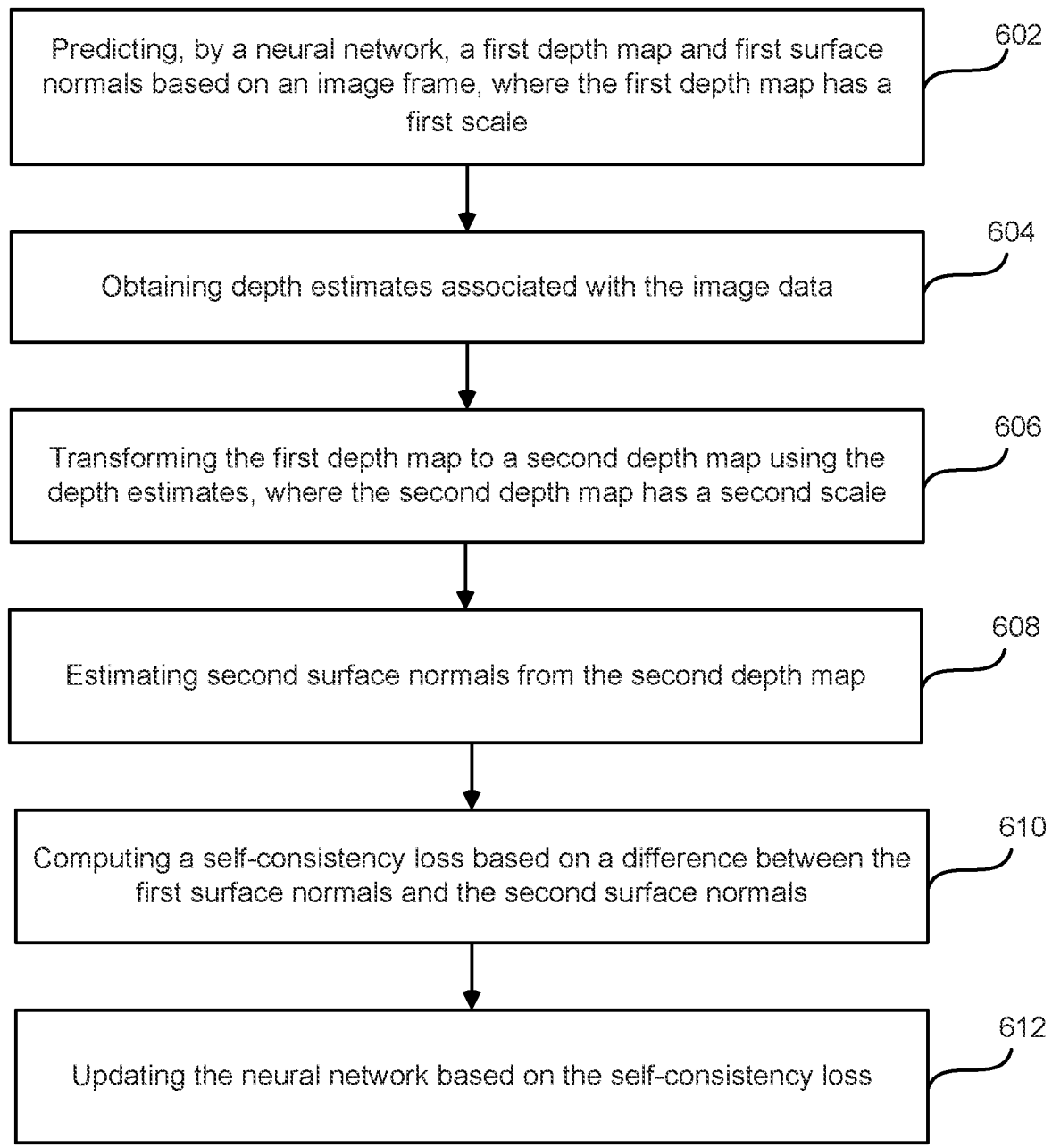
FIG. 6 illustrates a flowchart depicting example operations of adjusting a neural network according to an aspect.

FIG. 6 illustrates a flowchart 600 depicting example operations of a depth estimation system. Although the operations are described with reference to the depth estimation system 100 of FIGS. 1A through 1I, the operation of FIG. 6 may be applicable to any of the systems described herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

Operation 602 includes predicting, by a neural network 118, a depth map 120 (e.g., a first depth map) and first surface normals 122*a* based on an image frame 104*a*, where the depth map 120 has a first scale (e.g., a non-metric scale). Operation 604 includes obtaining depth estimates 108 associated with the image data 104. In some examples, the depth estimates 108 have depth values according to a second scale (e.g., a metric scale). Operation 606 includes transforming the depth map 120 to a depth map 138 (e.g., a second depth map) using the depth estimates 108, where the depth map 138 has a second scale (e.g., a metric scale). Operation 608 includes estimating second surface normals 122*b* from the depth map 138. Also, it is noted that the first and second scales are different scales that can be based on two different measurement systems with different standards.

Operation 610 includes computing a self-consistency loss 182 based on a difference between the first surface normals 122*a* and the second surface normals 122*b*. In some examples, the self-consistency loss 182 is an unsupervised loss. In some examples, the flowchart 600 includes computing a loss 180 (e.g., a supervised loss) based on a difference between the first surface normals 122*a* and ground truth normals 122*c*. Operation 612 includes updating the neural network 118 based on the self-consistency loss 182. In some examples, the neural network 118 is updated based on the self-consistency loss 182 and the loss 180.

Figure 7:
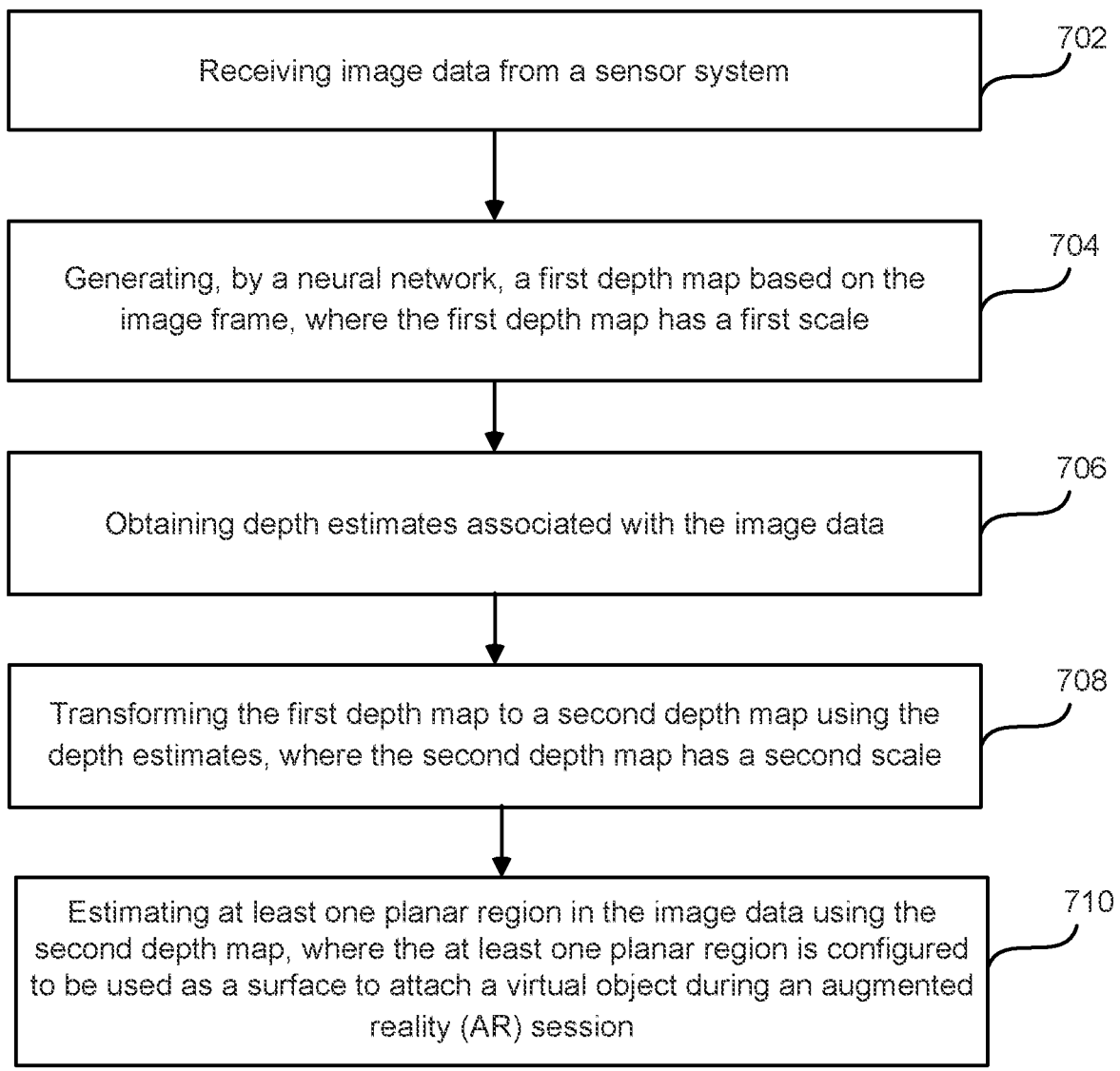
FIG. 7 illustrates a flowchart depicting example operations of a depth estimation system according to another aspect.

FIG. 7 illustrates a flowchart 700 depicting example operations of a depth estimation system. Although the operations are described with reference to the depth estimation system 100 of FIGS. 1A through 1I and the AR system 450 of FIG. 4, the operation of FIG. 7 may be applicable to any of the systems described herein. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes receiving image data 104 from a sensor system 102. Operation 704 includes generating, by a neural network 118, a depth map 120 (e.g., a first depth map) based on the image data 104, where the depth map 120 has a first scale (e.g., a non-metric scale). Operation 706 includes obtaining depth estimates 108 associated with the image data 104. In some examples, the depth estimates 108 have depth values according to a second scale (e.g., a metric scale). Operation 708 includes transforming the depth map 120 to a depth map 138 (e.g., a second depth map) using the depth estimates 108, where the depth map 138 has a second scale (e.g., a metric scale). Operation 710 includes estimating at least one planar region 495 in the image data 104 using the depth map 138, where the at least one planar region 495 is configured to be used as a surface to attach a virtual object 430 during an augmented reality (AR) session 174.

Example 1. A method for depth estimation, the method comprising: receiving image data from a sensor system; generating, by a neural network, a first depth map based on the image data, the first depth map having a first scale;

obtaining depth estimates associated with the image data; and transforming the first depth map to a second depth map using the depth estimates, the second depth map having a second scale.

Example 2. The method of Example 1, further comprising: generating, by the neural network, surface normals based on the image data.

Example 3. The method of any of Examples 1 through 2, wherein the first depth map is transformed to the second depth map using the surface normals and the depth estimates.

Example 4. The method of any of Examples 1 through 3, further comprising: generating visual feature points based on the image data, the visual feature points being associated with the depth estimates.

Example 5. The method of any of Examples 1 through 4, further comprising: obtaining the depth estimates from a depth sensor.

Example 6. The method of any of Examples 1 through 5, wherein the depth estimates are obtained during an augmented reality (AR) session executable by a mobile computing device.

Example 7. The method of any of Examples 1 through 6, further comprising: estimating affine parameters based on offsets between the first depth map and the depth estimates, the affine parameters including scale and shift, wherein the first depth map is transformed to the second depth map based on the affine parameters.

Example 8. The method of any of Examples 1 through 7, further comprising: predicting, by the neural network, first surface normals based on the image data; and predicting second surface normals from the second depth map.

Example 9. The method of any of Examples 1 through 8, further comprising: computing a self-consistency loss based on the first surface normals and the second surface normals.

Example 10. The method of any of Examples 1 through 9, further comprising: updating the neural network based on the self-consistency loss.

Example 11. The method of any of Examples 1 through 10, further comprising: estimating at least one planar region in the image data using the second depth map, the at least one planar region configured to be used as a surface to attach a virtual object.

Example 12. A depth estimation system comprising a sensor system configured to obtain image data; a neural network configured to generate a first depth map based on the image data, the first depth map having a first scale; a depth estimate generator configured to obtain depth estimates associated with the image data; and a depth map transformer configured to estimate affine parameters based on the depth estimates and the first depth map and transform the first depth map to a second depth map using the affine parameters, the second depth map having a second scale.

Example 13. The depth estimation system of Example 12, wherein the neural network is configured to execute on a mobile computing device.

Example 14. The depth estimation system of any of Examples 12 through 13, further comprising: a visual inertial motion tracker configured to generate visual feature points, the visual feature points being associated with the depth estimates.

Example 15. The depth estimation system of any of Examples 12 through 14, further comprising: a depth sensor configured to obtain the depth estimates.

Example 16. The depth estimation system of any of Examples 12 through 15, wherein the depth estimate generator is configured to obtain the depth estimates during an augmented reality (AR) session, the depth estimate generator configured to also obtain pose data, a gravity direction, and/or identification of one or more planar regions in the image data during the AR session.

Example 17. The depth estimation system of any of Examples 12 through 16, wherein the affine parameters include scale and shift for each depth estimation in the first depth map.

Example 18. The depth estimation system of any of Examples 12 through 17, wherein the depth map transformer includes a random sample consensus (RANSAC) based solver that minimizes an objective function to estimate the scale and shift.

Example 19. The depth estimation system of any of Examples 12 through 18, further comprising: a neural network trainer configured to predict, using the neural network, first surface normals based on the image data; predict second surface normals from the second depth map; compute a self-consistency loss based on the first surface normals and the second surface normals; compute a loss based on the first surface normals and ground truth normals; and/or update the neural network based on the self-consistency loss and the loss.

Example 20. The depth estimation system of any of Examples 12 through 19, further comprising: a plane generator configured to estimate at least one planar region in the image data using the second depth map, the at least one planar region configured to be used as a surface to attach a virtual object, the plane generator including a map converter configured to convert the second depth map to a point cloud, and a plane detector configured to detect the at least one planar region according to a plane fitting algorithm using the point cloud.

Example 21. A non-transitory computer-readable medium storing executable instructions that when executed by at least one processor cause the at least one processor to: receive image data from a sensor system; generate, by a neural network, a first depth map based on the image data, the first depth map having a first scale; obtain depth estimates associated with the image data; transform the first depth map to a second depth map using the depth estimates, the second depth map having a second scale; and estimate at least one planar region in the image data using the second depth map, the at least one planar region configured to be used as a surface to attach a virtual object during an augmented reality (AR) session.

Example 22. The non-transitory computer-readable medium of Example 21, wherein the executable instructions include instructions that when executed by the at least one processor cause the at least one processor to: estimate affine parameters based on offsets between the first depth map and the depth estimates, the affine parameters including scale and shift, wherein the first depth map is transformed to the second depth map based on the affine parameters.

Example 23. The non-transitory computer-readable medium of any of Examples 21 through 22, wherein the depth estimates are obtained from at least one of a visual inertial motion tracker, a depth sensor, a dual-pixel depth estimator, a motion stereo depth estimator, a sparse active depth estimator, and/or a pre-computed sparse map.

Example 24. The non-transitory computer-readable medium of any of Examples 21 through 23, wherein the executable instructions include instructions that when executed by the at least one processor cause the at least one processor to: generate, by the neural network, surface normals based on the image data, wherein the first depth map is transformed to the second depth map using the surface normals and the depth estimates.

Figure 8:
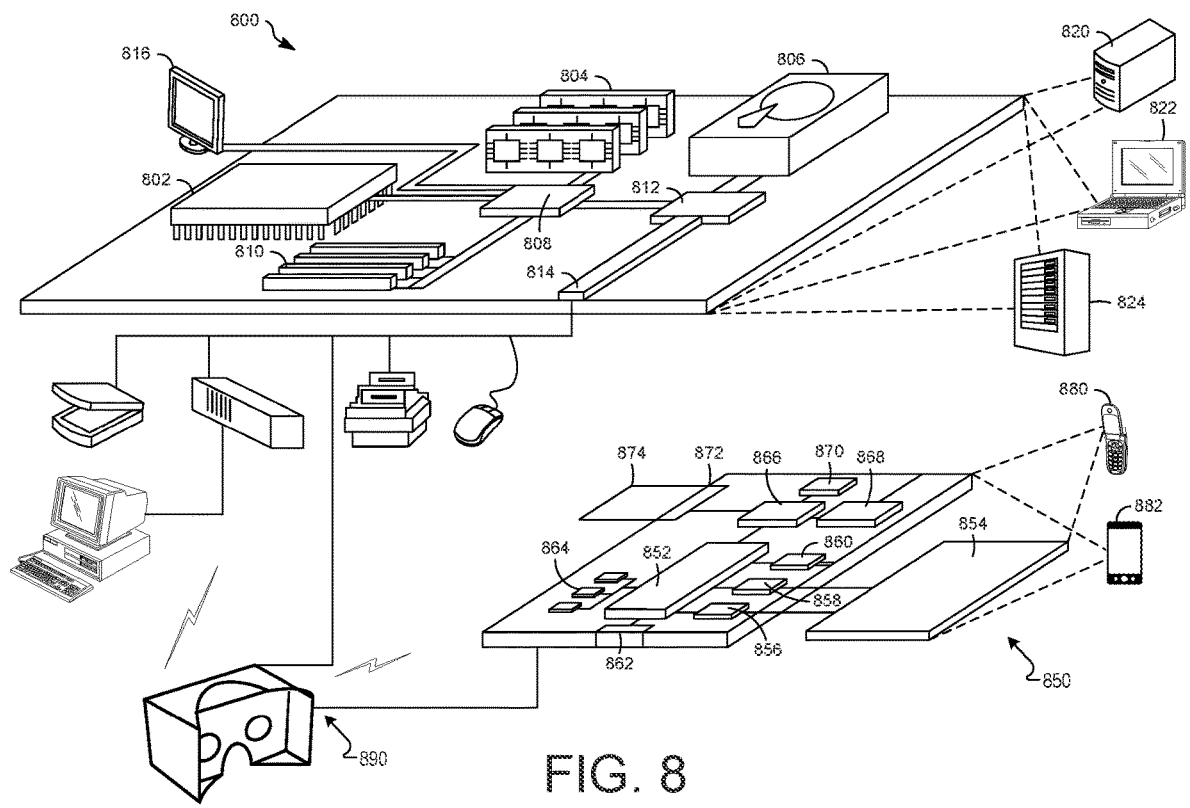
FIG. 8 illustrates example computing devices of the depth estimation system according to an aspect.

FIG. 8 shows an example of an example computer device 800 and an example mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provided as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for depth estimation, the method comprising:
   receiving an image frame from a sensor system of a computing device;
   generating, by a model, a first depth map and first surface normals based on the image frame, the first depth map having a first scale, the first scale being a non-real-world scale;
   receiving depth estimate data having values according to a second scale, the second scale being a real-world scale;
   estimating at least one affine parameter based on the depth estimate data and the first depth map;
   transforming the first depth map to a second depth map using the at least one affine parameter, the second depth map having the second scale;
   estimating second surface normals from the second depth map;
   computing a loss based on the first surface normals and the second surface normals; and
   updating the model based on the loss.

2. The method of claim 1, wherein the depth estimate data includes feature points computed from the image frame.

3. The method of claim 2, further comprising:
   detecting at least one planar region in the image frame from the feature points; and
   estimating the at least one affine parameter based on the depth estimate data-estimates and the at least one planar region.

4. The method of claim 1, wherein the at least one affine parameter is estimated based on offsets between the first depth map and the depth estimate data-estimates.

5. The method of claim 1, further comprising:
   generating a three-dimensional map from the second depth map; and
   detecting at least one planar region in the image frame using the three-dimensional map, the at least one planar region configured to be used to attach a virtual object.

6. The method of claim 1, wherein the first depth map is generated by the model using a single image frame as an input to the model.

7. The method of claim 1, wherein the depth estimate data includes depth data from a time-of-flight sensor.

8. The method of claim 1, wherein the depth estimate data includes depth data from a light detection and ranging sensor.

9. A method comprising:
   receiving image data from a sensor system of a user device;
   generating, by a model, a first depth map based on the image data, the first depth map having a first scale;
   obtaining depth estimates associated with the image data;
   transforming the first depth map to a second depth map using the depth estimates, the second depth map having a second scale;
   predicting, by the model, first surface normals based on the image data;
   predicting second surface normals from the second depth map;
   computing a self-consistency loss based on the first surface normals and the second surface normals; and
   updating the model based on the self-consistency loss.

10. A depth estimation system comprising:
    at least one processor; and
    a non-transitory computer-readable medium storing executable instructions that cause the at least one processor to execute operations, the operations comprising:
        receiving an image frame from a sensor system of a user device;
        generating, by a model, a first depth map and first surface normals based on the image frame, the first depth map having a first scale, the first scale being a non-real-world scale;
        receiving depth estimates having values according to a second scale, the second scale being a real-world scale;

estimating at least one affine parameter based on the depth estimates and the first depth map, the at least one affine parameter including at least one of shift or scale;

transforming the first depth map to a second depth map using the at least one affine parameter, the second depth map having the second scale;

estimating second surface normals from the second depth map;

computing a loss based on the first surface normals and the second surface normals; and updating the model based on the loss.

11. The depth estimation system of claim 10, wherein the model is configured to execute on the user device, the model including a depth-wise separable convolution, a rectified linear activation function, and a bilinear upsampling operation.

12. The depth estimation system of claim 10, wherein the depth estimates include feature points computed from the image frame.

13. The depth estimation system of claim 10, wherein the operations further comprise:

receiving pose data, a gravity direction, and planar region data; and estimating the at least one affine parameter also using the pose data, the gravity direction, and the planar region data.

14. The depth estimation system of claim 10, wherein the operations further comprise:

executing an objective function to estimate at least one of the scale or the shift.

15. The depth estimation system of claim 10, wherein the operations further comprise:

generating a three-dimensional (3D) map based on the second depth map; and detecting at least one planar region in the image frame by executing a plane fitting algorithm on the three-dimensional-3D map.

16. A depth estimation system comprising:

at least one processor; and a non-transitory computer-readable medium storing executable instructions that cause the at least one processor to execute operations, the operations comprising:

obtaining image data from a sensor system of a user device;

generating, by a model, a first depth map based on the image data, the first depth map having a first scale;

obtaining depth estimates associated with the image data;

estimating at least one affine parameter based on the depth estimates and the first depth map;

transforming the first depth map to a second depth map using the at least one affine parameter, the second depth map having a second scale;

predicting, using the model, first surface normals based on the image data;

predicting second surface normals from the second depth map;

computing a self-consistency loss based on the first surface normals and the second surface normals;

computing a loss based on the first surface normals and ground truth normals; and updating the model based on the self-consistency loss and the loss.

17. A non-transitory computer-readable medium storing executable instructions that when executed by at least one processor cause the at least one processor to execute operations, the operations comprising:

receiving an image frame from a sensor system of a user device;

generating, by a model, a first depth map and first surface normals based on the image frame, the first depth map having a first scale, the first scale being a non-real-world scale;

receiving depth estimate data having values according to a second scale, the second scale being a real-world scale;

estimating at least one affine parameter based on the depth estimate data and the first depth map;

transforming the first depth map to a second depth map using the at least one affine parameter, the second depth map having the second scale, the second scale being a real-world scale;

estimating second surface normals from the second depth map;

computing a loss based on the first surface normals and the second surface normals; and updating the model based on the loss.

18. The non-transitory computer-readable medium of claim 17, wherein the operations further comprise:

estimating the at least one affine parameter based on offsets between the first depth map and the depth estimate data.

19. The non-transitory computer-readable medium of claim 17, wherein the depth estimate data includes feature points computed from the image frame.

20. The non-transitory computer-readable medium of claim 17, wherein the operations further comprise:

generating a three-dimensional map based on the second depth map; and detecting at least one planar region in the image frame using the three-dimensional map, the at least one planar region configured to be used to attach a virtual object.

21. The non-transitory computer-readable medium of claim 17, wherein the depth estimate data includes depth data from a time-of-flight sensor or a light detection and ranging sensor.

* * * * *